(12) United States Patent
Moore et al.

(10) Patent No.: US 6,227,961 B1
(45) Date of Patent: May 8, 2001

(54) HVAC CUSTOM CONTROL SYSTEM (75) Inventors: Scott W. Moore, Arlington Heights, IL (US); Terry L. Webb, Roanoke; Michael C. Brown, Salem, both of VA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/231,050

(22) Filed: Jan. 14, 1999

Related U.S. Application Data (60) Provisional application No. 60/086,201, filed on May 21, 1998.

(51) Int. Cl.⁷ .................................................. F24F 11/04
(52) U.S. Cl. ............................................ 454/229; 454/236
(58) Field of Search ................................... 454/229, 236; 236/49.3

(56) References Cited

U.S. PATENT DOCUMENTS

| | | | |
|---|---|---|---|
| Re. 28,946 | 8/1976 | Martz et al. ............................. | 415/17 |
| 3,685,355 | 8/1972 | DeBaun ................................... | 73/212 |
| 3,733,900 | 5/1973 | DeBaun ................................... | 73/212 |
| 4,052,897 | 10/1977 | DeBaun ................................... | 73/212 |
| 4,186,655 | 2/1980 | Mallory et al. . | |
| 4,257,318 | 3/1981 | Johannsen . | |
| 4,392,417 | 7/1983 | Johannsen . | |
| 4,407,185 | 10/1983 | Haines et al. . | |
| 4,428,529 | 1/1984 | Bentsen ................................... | 236/49 |
| 4,437,608 | 3/1984 | Smith ....................................... | 236/13 |
| 4,441,651 | 4/1984 | Dill .......................................... | 236/49 |
| 4,487,363 | 12/1984 | Parker et al. ............................ | 236/49 |
| 4,530,395 | 7/1985 | Parker et al. ............................ | 165/16 |
| 4,549,601 | 10/1985 | Wellman et al. ......................... | 165/2 |
| 4,559,835 | 12/1985 | DeBaun ................................... | 73/861.66 |
| 4,630,670 | 12/1986 | Wellman et al. ........................ | 165/16 |
| 4,646,964 | 3/1987 | Parker et al. ............................ | 236/49 |
| 4,705,457 | 11/1987 | Belusa ..................................... | 417/22 |
| 4,836,095 | 6/1989 | Wright, Jr. . | |
| 4,836,096 | 6/1989 | Avery . | |
| 4,850,264 | 7/1989 | Kiser . | |
| 4,862,052 | 8/1989 | Unsworth et al. ...................... | 318/757 |
| 4,916,370 | 4/1990 | Rowan et al. .......................... | 318/368 |
| 4,921,164 | 5/1990 | Gotou et al. ............................ | 236/49.3 |
| 4,931,948 | 6/1990 | Parker et al. ............................ | 364/505 |
| 4,947,928 | 8/1990 | Parker et al. ............................ | 165/22 |
| 4,978,896 | 12/1990 | Shah ........................................ | 318/254 |
| 4,978,897 | 12/1990 | Merrison et al. ....................... | 318/268 |
| 4,995,307 | 2/1991 | Floyd . | |
| 5,005,636 | 4/1991 | Haessig ................................... | 165/16 |
| 5,019,757 | 5/1991 | Beifus ..................................... | 318/254 |
| 5,103,391 | 4/1992 | Barrett .................................... | 364/133 |

(List continued on next page.)

Primary Examiner—Harold Joyce
(74) Attorney, Agent, or Firm—Senniger, Powers, Leavitt & Roedel; Damian Wasserbauer (57) ABSTRACT

A fan control system suitable for use in air moving applications has a pressure sensor responsive to an air pressure in an air duct for supplying a static pressure signal representative of the air pressure. A supply air flow sensor is responsive to an air flow in a supply air duct and supplies a supply air flow signal representative of the air flow in the supply air duct. A return air flow sensor is responsive to an air flow in a return air duct and supplies a return air flow signal representative of the air flow in the return air duct. A supply fan moves air in the supply air duct. The supply fan is driven by a supply fan motor. A return fan moves air in the return air duct. The return fan is driven by a return fan motor. A unitary volumetric air flow controller is connected to the supply fan motor and to the return fan motor. The air flow controller selectively applies a supply drive power signal to the supply fan motor to energize the supply fan motor, and selectively applies a return drive signal to the return fan motor to energize the return fan motor. The power drive signals are responsive to the static pressure signal, supply air flow signal, and return air flow signal.

16 Claims, 4 Drawing Sheets

U.S. PATENT DOCUMENTS

| | | | |
|---|---|---|---|
| 5,179,524 | 1/1993 | Parker et al. | 364/505 |
| 5,279,609 | 1/1994 | Meckler | 236/49.3 |
| 5,292,280 | 3/1994 | Janu et al. | 454/229 |
| 5,404,934 * | 4/1995 | Carlson et al. | 236/49.3 X |
| 5,418,438 | 5/1995 | Hollenbeck | 318/432 |
| 5,538,471 | 7/1996 | Guiles, Jr. | 454/238 |
| 5,540,555 | 7/1996 | Corso et al. | 417/44.2 |
| 5,540,619 | 7/1996 | Ahmed | 454/256 |
| 5,544,697 * | 8/1996 | Clark | 236/49.3 X |
| 5,573,181 | 11/1996 | Ahmed | 236/49.3 |
| 5,592,059 | 1/1997 | Archer | 318/254 |
| 5,597,354 | 1/1997 | Janu et al. | 454/229 |
| 5,687,052 | 11/1997 | Bennett | 361/190 |

* cited by examiner

HVAC CUSTOM CONTROL SYSTEM

CROSS REFERENCE TO RELATED APPLICATIONS

The invention of the present application claims priority based on Provisional Application Ser. No. 60/086,201, filed on May 21, 1998.

FIELD OF THE INVENTION

The invention generally relates to a Heating, Ventilation, and Air Conditioning (HVAC) custom control system and particularly relates to an integrated control system requiring less field wiring and providing an anti-windmilling capability.

BACKGROUND OF THE INVENTION

Building pressure control is an increasingly important aspect of modern HVAC systems. Building pressure reflects the ratio of outside air entering the building envelope to the exhaust air leaving the envelope. Further, modern building designs often require variable air volume (VAV) systems that supply a constant temperature air (e.g., 55 degrees F.) to the building's supply ductwork. The temperature and air flow in individual areas or zones within the building are controlled by positioning dampers or boxes that allow more or less air into the space depending on the load.

Proper operation of a supply VAV system relies on a constant (i.e., static) pressure being maintained in the supply duct. Such a constant pressure ensures a sufficient supply of conditioned air on demand. Thus, VAV systems use static pressure control to sense and maintain supply duct pressure. VAV systems may achieve proper return air control by employing volumetric flow synchronization (volumetric flow control). Volumetric control systems modulate the return fan based off of actual supply and return fan air flow readings.

In the prior art, volumetric fan control was both complex and very costly, resulting in building owners and engineers opting for less costly, less complex, and consequently less effective systems. However, as the concern for indoor air quality has increased in recent years, so too has the concern for effective HVAC control. One area receiving a great deal of attention is the so-called "sick building syndrome." Further, new guidelines for indoor air quality have forced engineers and building owners to install systems that allow them to accurately control the mix of outside and inside air in compliance with those guidelines. ASHARE-62 IAQ is an example one such guideline.

Prior art volumetric fan control systems do not adequately meet these new building demands in a cost effective manner. First, prior art volumetric fan control systems require separate control panels, drives and probes. Second, these prior art systems require substantial field installation and set-up. Thus, prior art systems result in, inter alia, increased installation and operating costs. Further, due to the nature of integrating these separate systems, it may be difficult or impracticable for the specifying engineer and/or building owner to show compliance with ASHARE-62 IAQ guidelines.

As indicated above, most HVAC systems employ one or more fans in the supply and return ducts. In the interest of efficiency, as well as pressure and volume control, any given fan is not continuously operated. When a fan is idle (not powered), it may, however, continue to spin either from momentum or from persistent air flow within the duct. This unpowered spinning is referred to as "windmilling." Further, windmilling can occur in both a forward direction (e.g., the normally desired direction of rotation), or a reverse direction (e.g., the normally undesired direction of rotation).

Prior art HVAC systems do not account for this windmilling when powering or depowering fan motors. Applying power to a fan that is spinning in the reverse direction can cause excess torque forces that stress the fan and/or fan motor. Starting a fan motor when it is spinning in the reverse direction may also cause an overload and trip the applied adjustable speed drive.

There is a need, therefore, for an improved, cost effective, and energy efficient HVAC fan control system. In particular, there is a need for an HVAC fan control system the provides a unitary control and drive panel with reduced installation costs.

SUMMARY OF THE INVENTION

It is therefore seen desirable to provide an improved fan control system. Thus, there is a need for an improved, cost effective, and energy efficient HVAC fan control system. There is a need for an HVAC fan control system that provides a unitary control and drive panel with reduced installation costs. There is also a need for an HVAC fan control system that employs a unitary volumetric flow controller. There is another need for a fan control system with reduce installation costs and complexity. There is also a need for a fan control system that provides an anti-windmilling capability to avoid stressing the fan and/or fan motor. There is a need for a fan control system that uses DC injection breaking to accomplish the anti-windmilling capability. There is further a need for a fan control system that ensures a constant supply duct pressure. There is still another need for a unitary fan control system that selectively supplies power to a supply fan and a return fan in response to air flow rates in the supply and return air ducts. There is also a need for a fan control system that provides verifiable compliance with indoor air quality guidelines. There yet another need for a unitary fan control system that accurately controls fan speed based upon actual flow rate requirements.

The invention comprises a fan control system suitable for use in air moving applications. The fan control system has a pressure sensor responsive to an air pressure in an air duct for supplying a static pressure signal representative of the air pressure. A supply air flow sensor is responsive to an air flow in a supply air duct and supplies a supply air flow signal representative of the air flow in the supply air duct. A return air flow sensor is responsive to an air flow in a return air duct and supplies a return air flow signal representative of the air flow in the return air duct. A supply fan moves air in the supply air duct. The supply fan is driven by a supply fan motor. A return fan moves air in the return air duct. The return fan is driven by a return fan motor. A unitary volumetric air flow controller is connected to the supply fan and to the return fan. The air flow controller selectively applies a supply drive power signal to the supply fan motor to energize the supply fan motor, and selectively applies a return drive signal to the return fan motor to energize the return fan motor. The power drive signals are responsive to the static pressure signal, supply air flow signal, and return air flow signal.

DETAILED DESCRIPTION OF PREFERRED EMBODIMENTS

Figure 1:
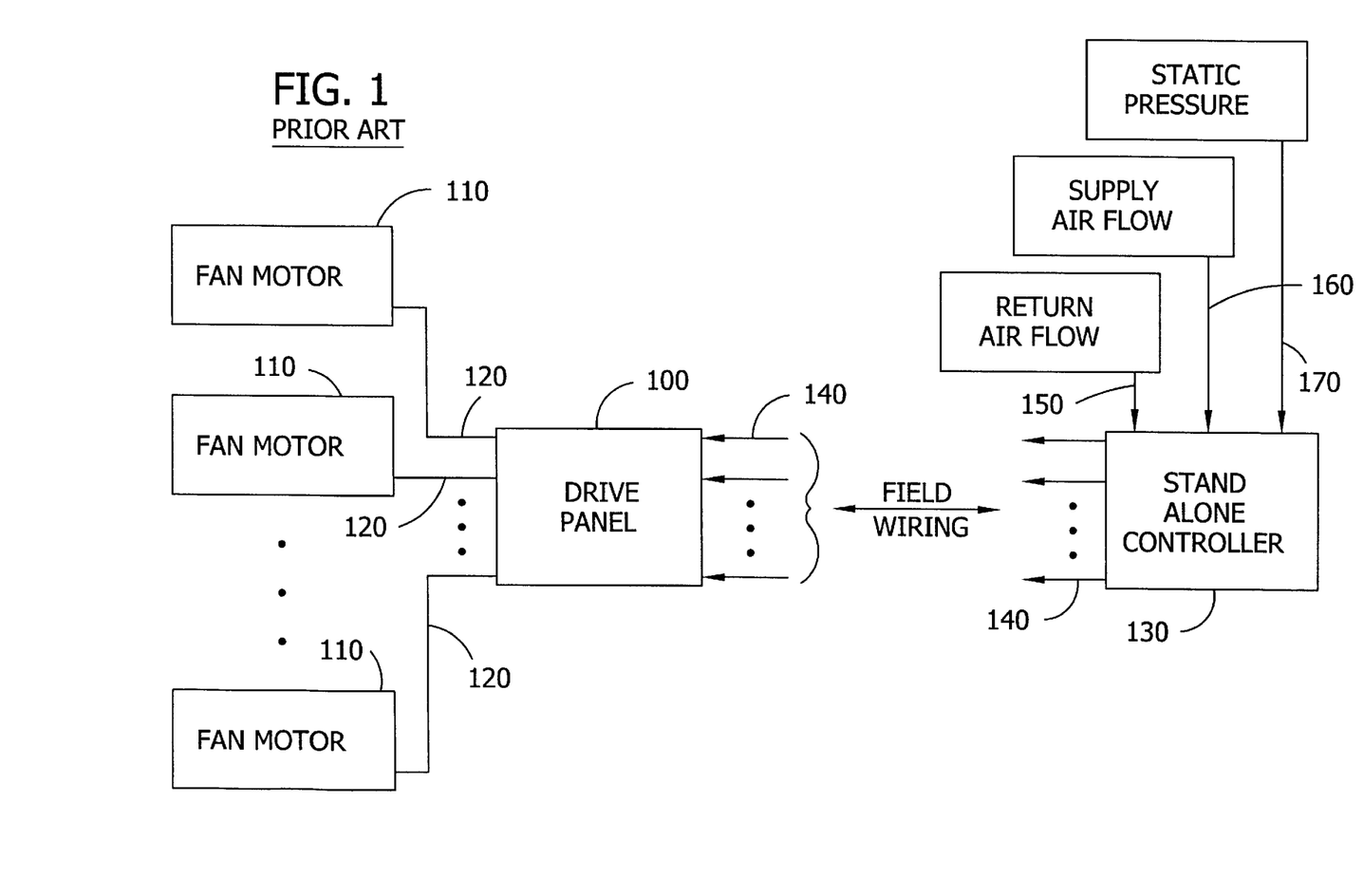
FIG. 1 is a block diagram of a prior art HVAC fan control system.

FIG. 1 shows a block diagram of an HVAC air flow controller according to the prior art. In FIG. 1, a separate drive panel 100 is connected to a plurality of duct fan motors 110 via motor control lines 120. There are a variety of suitable fans known in the HVAC art, such as, for example, centrifugal fans or vane-axial fans. The drive panel 100 is further connected to a stand alone controller 130. A major disadvantage of such prior art systems is that separate, manually installed, field wiring 140 is required to connect the drive panel 100 to the stand alone controller 130. The additional field wiring not only increases design and installation costs, it also increases the complexity, and as such, the cost of maintaining such systems. An example of a prior art drive panel 100 is the GE Fuji Electric AF-300E$™ bypass panel comprising an adjustable frequency drive.

Referring still to FIG. 1, the stand alone controller 130 receives at least three control signals. In particular, the controller 130 receives a return air flow signal 150, a supply air flow signal 160, and a supply duct static pressure signal 170.

In operation, the drive panel 100 provides power control to fan motors 110 via motor control lines 120. The drive panel 100 typically comprises an inverter drive for controlling the voltage applied to the fan motors 110 via motor control lines 120. By controlling the voltage, drive panel 100 controls the rotational speed of the fan motors 110, thus controlling the air flow in the supply and return air ducts.

The stand alone controller 130 responds to the return air flow signal 150, supply air flow signal 160, and supply duct static pressure signal 170 to provide speed (frequency) reference signals to the drive panel 100 via field wiring 140. The drive panel 100 uses these reference signals to adjust the voltage applied to fan motors 110 to keep the supply air flow and return air flow within desired limits.

One disadvantage of prior art systems, such as that shown in FIG. 1, is that they can turn on the fan motors 110 when the associated fan is free spinning due to momentum or air flow within the duct. This phenomenon is referred to as "windmilling." If the fan is windmilling in the reverse direction, applying a large amount of power can stress the fan and the fan motor.

Figure 2:
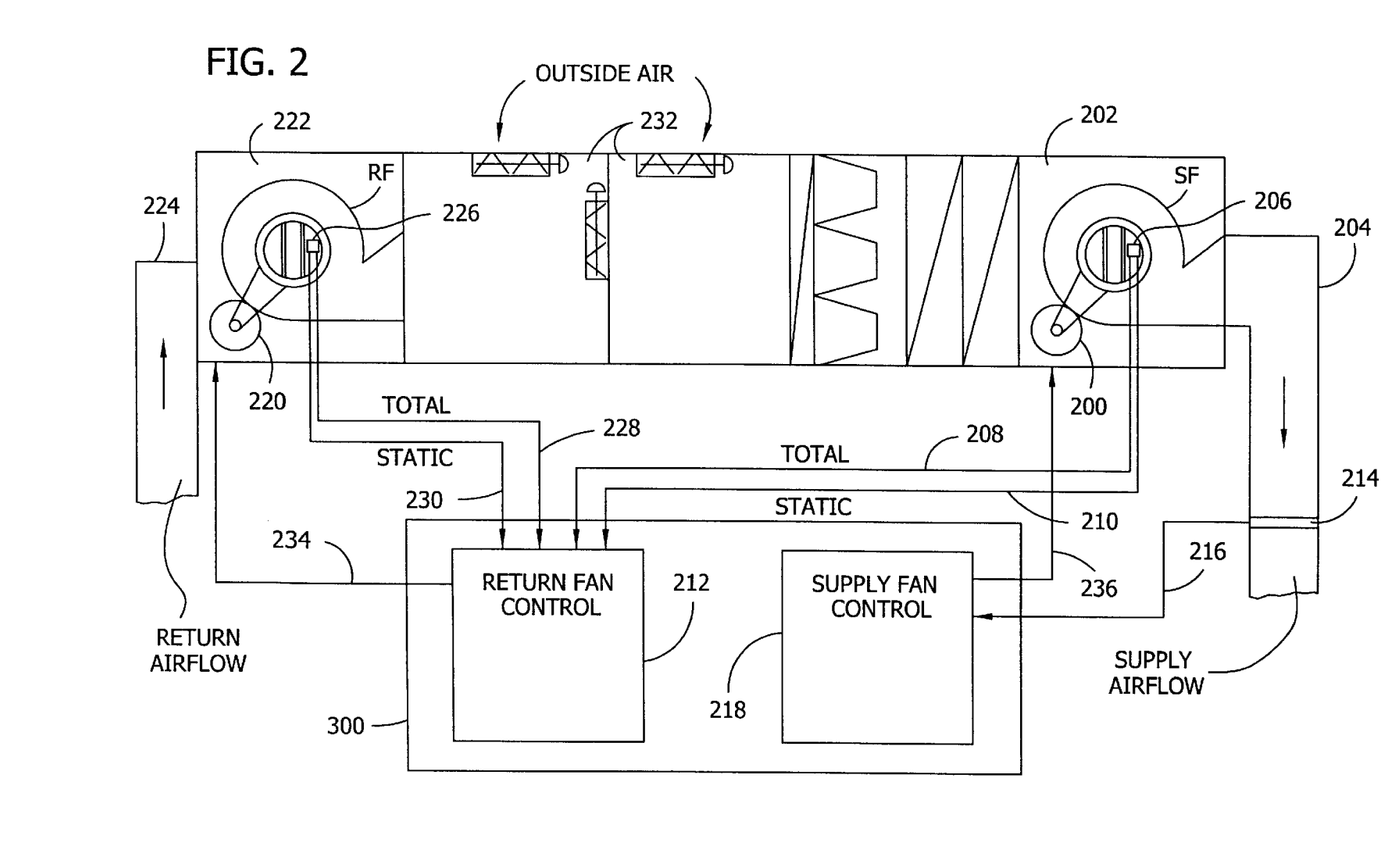
FIG. 2 is a functional control system interface diagram of an HVAC fan control system according to the present invention.

FIG. 2 is a functional control system interface drawing of an air flow control system according to the present invention. A supply fan SF, driven by a supply fan motor 200 and mounted in a supply fan chamber 202, is connected to a supply air duct 204 and provides a supply air flow as shown. A first air flow sensor 206 mounted in the supply fan chamber 202 provides a total air pressure signal via line 208 and a static air pressure signal via line 210 to a return fan control 212. A static pressure sensor 214 is mounted in the supply air duct 204. The static pressure sensor 214 provides a supply duct static pressure signal via line 216 to a supply fan control 218. Return fan control 212 and supply fan control 218 are part of a unitary volumetric air flow controller 300.

A return fan RF, driven by a return fan motor 220 and mounted in a return fan chamber 222 is connected to a return air duct 224. A second air flow sensor 226 mounted in the return fan chamber 222 provides a total air pressure signal via line 228 and a static air pressure signal via line 230 to the return fan control 212. Outside air is available from an air exchange chamber 232 between the return fan RF and supply fan SF.

The air flow sensors 206 and 226 may be installed in the inlet cone of centrifugal fans or the inlet bell of vane-axial fans. Other installation positions within the duct system are possible.

The return fan control 212 monitors air flow in the supply and return air ducts 204 and 224. In particular, the return fan control 212 monitors total and static pressure in both the return fan RF and supply fan SF via lines 208, 210, 228 and 230. Based on this supply and return air flow information, the return fan control 212 adjusts the return fan speed via the return fan control signal 234 to maintain the return air flow within desired limits—typically some target cubic feet per minute (CFM)—according to the following equation:

$$\text{Return Air Flow} = \text{Supply Air Flow} - \text{Outside Air} \quad [1]$$

The amount of outside air is determined by an operator selected differential set point input. Hence, if the return air fan RF operates at a speed that produces a lower return air flow than the supply air flow, the supply fan SF will draw more outside air from the air exchange chamber.

As shown in FIG. 2, the supply fan control 218 monitors the duct static pressure signal via line 216 and provides a supply fan control signal via line 236 in response thereto to ensure a constant (i.e., static) pressure in the supply duct 204. In this way, the supply fan control 218 in conjunction with the return fan control 110 ensure proper volumetric air flow control.

The volumetric air flow control system shown in FIG. 2, provides a supply of constant temperature air (typically 55 degrees F.) to the building supply duct 204. Such a system is referred to as a variable air volume (VAV) system. Individual areas or zones are controlled by positioning adjustable dampers or boxes (not shown) along the supply duct 204 to allow more or less air into a given space depending on the local load requirements. By maintaining a constant (static) pressure in the supply duct 204, the system ensures that there is a sufficient supply of conditioned air to meet changing demands within the building. The system further achieves overall volume control by controlling the speed of the return fan RF and/or the supply fan SF.

If the static pressure is too low, there may not be enough supply air to meet demands. In that case, the supply fan control 218 can increase the speed of the supply fan SF. If the static pressure in the supply duct 204 is too high, supply fan control 218 can decrease the speed of the supply fan SF (or depower the supply fan completely). It is too be understood that changing the flow rate in the supply duct 204 necessarily affects a flow rate differential between the supply air flow and the return air flow. Hence, in a volumetric air flow control system, it is likely that the return fan control 212 will also have to adjust the speed of the return fan RF, in order to maintain the desired flow rate differential and static pressure.

In sum, FIG. 2 illustrates a unitary HVAC fan control system. The fan control system includes static pressure sensor 214 that is responsive to an air pressure in the supply air duct 204. The static pressure sensor 214 supplies a static pressure signal via line 216 that is representative of the air pressure. A supply air flow sensor (the first air flow sensor 206) is responsive to an air flow in the supply air duct 204.

The supply air flow sensor provides the total air pressure signal via line 208 and the static air pressure signal via line 210 which together comprise a signal representative of the air flow in the supply air duct 204. A return air flow sensor (the second air flow sensor 226) is responsive to an air flow in the return air duct 224. The return air flow sensor provides the total air pressure signal via line 228 and the static air pressure signal via line 230 which together comprise a signal representative of the air flow in the return air duct 224. Supply fan SF moves air in the supply air duct 204. Supply fan SF is driven by supply fan motor 200. Return fan RF moves air in the return air duct 224. Return fan RF is driven by return fan motor 220. The unitary volumetric air flow controller 300 is connected to the supply fan motor 200 and the return fan motor 220. The unitary volumetric air flow controller 300 selectively applies a supply drive power signal (via supply control signal line 236) to the supply fan motor 200 to energize it. The unitary volumetric air flow controller 300 also selectively applies a return drive power signal (via return fan control signal line 234) to the return fan motor 220 to energize it. The power signals are responsive to the static pressure signal, the supply air flow signal, and the return air flow signal.

Figure 3:
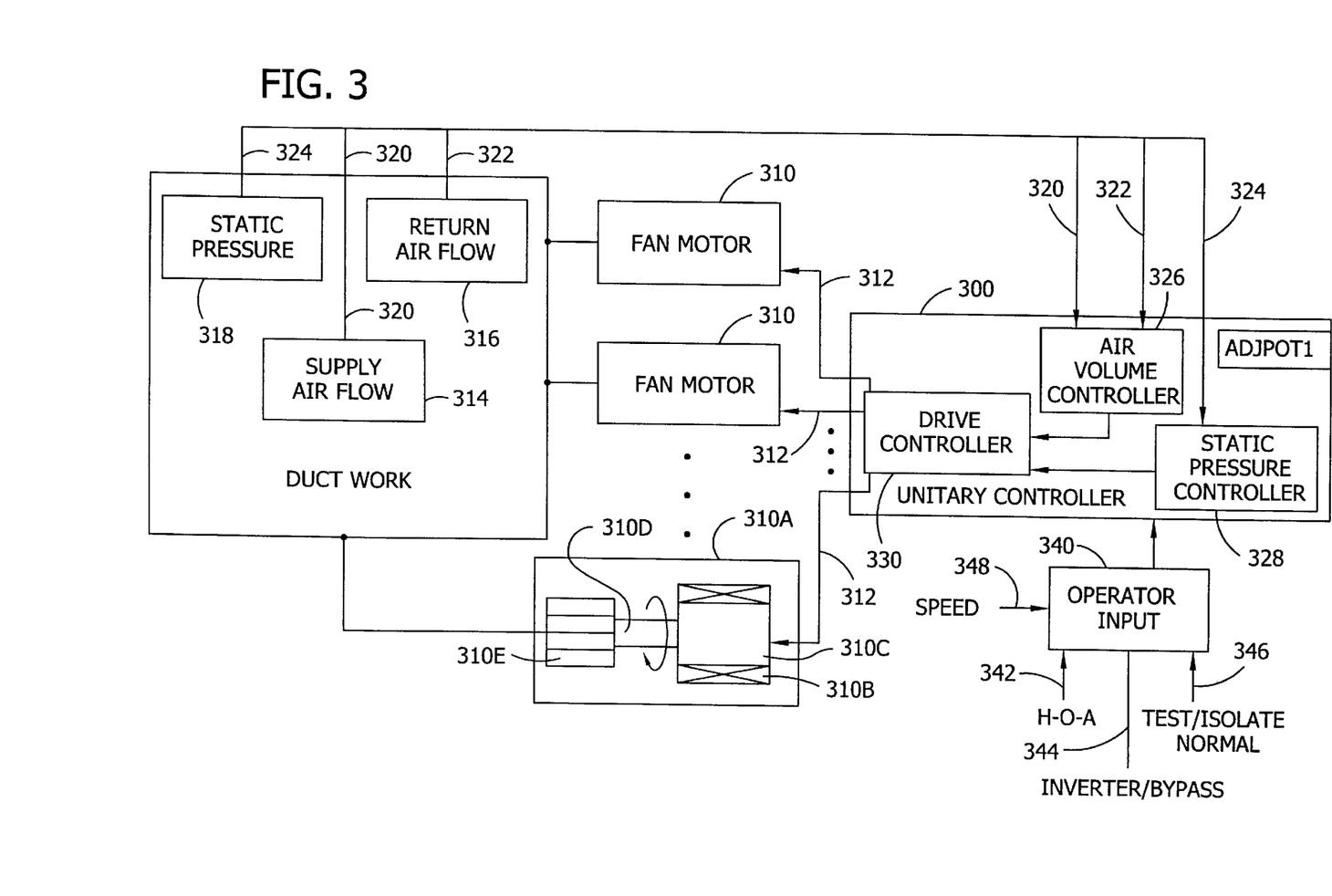
FIG. 3 is a block diagram of a preferred embodiment of a unitary HVAC fan control system according to the present invention.

FIG. 3 is a block diagram of a preferred embodiment of an HVAC volumetric fan control system according to the present invention. The unitary volumetric air flow controller 300 [hereinafter "unitary controller"] is connected to the plurality of fan motors 310 via motor control lines 312. While the fan motors 310 are typically the same general design, one of the motors 310A is illustrated in greater detail. In particular, motor 310A comprises a stator 310B, a rotor 310C, a rotating shaft 310D and a fan 310E. The general operation of such motors is known in the art.

The fan motors 310 are connected to the building duct work (the duct work is shown in greater detail in FIG. 2). A supply air flow sensor 314 is mounted within the supply air duct system. A return air flow sensor 316 is similarly mounted within the return air duct system. A static pressure sensor 318 responsive to static air pressure in the supply air duct is also mounted in the supply air duct. Each of these sensors 314, 316, and 318 provides corresponding signals to the unitary controller 300. In particular, the supply air flow sensor 314 provides a supply air flow signal via line 320 representative of a supply air flow volume in the supply duct. Return air flow sensor 316 provides a return air flow signal via line 322 representative of a return air flow volume in the return duct. Finally, the static pressure sensor 318 provides a static pressure signal via line 324 representative of a static pressure in the supply duct.

The unitary controller 300 further comprises the following: an air volume controller 326 (also referred to as a "synchronous volume controller"), a static pressure controller 328, and a drive controller 330. The air volume controller 326 responds to the supply air flow signal via line 320 and the return air flow signal via line 322. The static pressure controller 328 responds to the static pressure signal via line 324. The air volume controller 326 and pressure controller 328 together comprise a process controller that may be implemented using a single or multiple controllers. In the preferred embodiment, a single controller is used. It is to be understood that there are a variety of means for accomplishing the process control function, such as, for example, programmable logic controllers (PLCs), microprocessors, microcontrollers, discrete logic circuitry, analog controllers, and combinations thereof.

Though not shown, the static pressure signal may be routed to a separate building management system (BMS). This allows for, among other things, remote monitoring of system static pressure, data event logging and graphic display of system conditions. Similarly, the supply air flow signal and return air flow signal may be routed to a BMS to allow for remote monitoring of supply and return fan air volumes, data logging and graphic presentation.

In the preferred embodiment as shown in FIG. 3, the static pressure controller 328 preferably comprises a proportional-integral-inverse derivative controller. The air volume controller 326 likewise preferably comprises a proportional-integral-inverse derivative controller. The operation of such controllers is known in the art, thus a detailed description is not required. Further, the invention may be carried out with controllers using other than proportional-integral-inverse derivative control techniques.

The drive controller 330 responds to information from the process controller comprising air volume controller 326 and static pressure controller 328. The drive controller 330, air volume controller 326, and static pressure controller 328 may be functionally or physically partitioned into a return fan control and a supply fan control as shown in FIG. 2. It is contemplated that the unitary controller 300 may be a plurality of separate controllers or PLCs (such as illustrated in FIG. 3) located within a single, unitary structure and assembled at the factory as a unitary structure. Alternatively, the controller 300 may be a single controller (such as a single microprocessor or single PLC) programmed and configured to provide both return air and supply fan control and programmed and configured to provide drive control, air volume control and static pressure control. In the preferred embodiment shown in FIG. 3, the drive controller 330 comprises one or more inverter drives for driving fan motors 310. The general operation of inverter drives is known in the art and will not be further described herein. It is also possible to use other types of motor drives depending upon, inter alia, the type of motor(s) used.

Operator inputs are provided to the unitary controller 300 via an operator input control 340 (also referred to as a set point control panel). In the preferred embodiment, operator input control 340 is actually an integrated part of the unitary controller 300, not a separate unit; operator input control 340 is illustrated in FIG. 3 as a separate unit for convenience only.

In the embodiment shown in FIG. 3, operator input control 340 further comprises a Hand-Off-Auto (HOA) selector 342, an Inverter/Bypass selector 344, a Test/Isolate/Normal selector 346, and a speed select potentiometer 348. The operator input control may also comprise local setpoint controllers (not shown). Local setpoint control may be accomplished using input means such as potentiometers, keypads and the like, to enter desired setpoints for, inter alia, supply duct static pressure, and supply and return fan air volumes. Remote setpoint control may be provided by separate, preferably analog, input signals from an optional building management system (BMS).

Static pressure sensor 318 is responsive to static air pressure within the supply air duct and supplies a static pressure signal via line 324 to the unitary controller 300. The supply air flow sensor 314 is responsive to air flow within the supply air duct. Supply air flow sensor 314 provides a supply air flow signal via line 320 representative of the air flow in the supply duct to the unitary controller 300. The return air flow sensor 316 is responsive to air flow within the return air duct. The return air flow sensor 316 provides a return air flow signal via line 322 representative of the air flow in the return duct to the unitary controller 300. The unitary controller 300 selectively controls the application of supply drive power to the fans 310 via motor control lines 312 in response to the static pressure signal, supply air flow signal, and return air flow signal.

The unitary controller 300 also provides simultaneous static pressure control. Static pressure control ensures proper operation of a variable air volume system (VAV), the general operation of which is described above with regard to FIG. 2. VAV systems rely on constant (static) pressure in the supply duct to guarantee a sufficient supply of conditioned air on demand. The unitary controller 300 of the present invention receives the static pressure signal via line 324 from the static pressure sensor 318 mounted within the supply duct. While FIG. 3 illustrates a single static pressure signal and sensor 318, it is possible to construct an HVAC control system that uses multiple pressure sensors and/or signals. The static pressure controller 328 monitors the static pressure signal via line 324. If the static pressure signal indicates that the supply duct pressure is below a desired level, the static pressure controller 328 directs the drive controller 330 to adjust the speed of the supply or return fan motors 310 as necessary. For example, the drive controller 330 may modulate the motor control lines 312 (the supply or return fan motor drive power signals) in response to the supply air flow signal 320 and return air flow signal 322.

The unitary controller 300 further provides volumetric flow synchronization. Volumetric flow synchronization allows precise control over the air flow rates in both the return and supply air ducts. As such, the controller 300 ensures a sufficient amount of outside air is introduced to the building in compliance with ASHARE-62 guidelines. Volumetric flow synchronization also helps maintain a stable pressure in the building envelope.

The air volume controller 326 within unitary controller 300 monitors the air flow signals via lines 320 and 322 from the supply air flow sensor 314 and return air flow sensor 316 respectively, and provides commands to the drive controller 330. The drive controller 330, in turn, modulates the return fan in response to these commands. For example, the supply and return air flow signals 320 and 322 may be generated from air flow measuring stations within the supply and return duct system (see FIG. 2). Differential pressure regulators may then transform the flow rates into pneumatic air flow signals corresponding to supply air flow signal 320 and return air flow signal 322. These signals are then fed to a dual input synchronous volume controller such as air volume controller 326 via lines 320 and 322. The air volume controller 326 then causes the drive controller 330 to modulate a return fan motor to establish a supply and return air flow rate difference sufficient for a desired pressurization and ventilation level.

As shown in FIG. 3, the operator input 340 comprises a variety of operator selectable or adjustable controls. The Hand-Off-Auto (H-O-A) switch 342 selects between different motor speed references. When this switch is in the "hand" position, the drive controller 330 uses a speed (or frequency) reference taken from an operator selectable speed potentiometer, shown in FIG. 3 as speed select potentiometer 348. In the "auto" position, the drive controller 330 uses speed references from the process controller comprising the air volume controller 326 and the static pressure controller 328. When the unitary controller 300 is in the auto mode, a separate contact (not shown) can also be used to allow for remote operation of the drive controller 330 by a building management system. When the H-O-A switch is in the "off" position, the drive controller 330 is depowered.

Another operator input may be an inverter/bypass selector 344. When the inverter/bypass selector is in the "inverter" position, the fan motors 310 are powered by the drive controller 330. When the inverter/bypass selector is in the "bypass" position, however, the fan motors 310 are powered directly from the AC line supplied to the unitary controller 300. In the bypass mode, the fan motors 310 run at essentially full speed, as such, volumetric flow control is lost.

A Test-Isolate-Normal switch may also be provided as part of the operator input 340. In the "test" position, a user can supply power to the drive controller 330 but prevent the controller from supplying drive power to any of the fan motors 310 (i.e., the drive controller 330 is latched off from control lines 312 via an output contactor which is not shown). In the test mode, for example, a user may set the desired drive controller 330 options while the fan motors 310 are driven directly by AC power in the bypass mode discussed above with respect to the Inverter/Bypass selector. When the Test-Isolate-Normal switch is in the "isolate" position, not only is the drive controller 330 latched off from the control lines, no input power is applied to the drive controller 330. In this mode, the drive controller 330 may be repaired while the fan motors 310 are powered directly by the AC line in the bypass mode. Finally, when the Test-Isolate-Normal switch is in the "normal" position, the drive controller 30 is fully operational. In the normal mode, operation of the fan motors 310 depends upon the H-O-A selector position.

Those skilled in the art will further recognize that operator input 340 will include indicator lights and displays of the type typically used in the art.

Advantageously, the unitary controller 300 further comprises an anti-windmilling system. When a supply or return duct fan that is not on (i.e., no supply drive signal is applied) is then commanded/powered on, the drive controller 330 may provide a fixed period of DC injection braking to ensure that any windmilling fan is brought substantially to a halt prior to applying drive current. As discussed above in the context of FIG. 1, windmilling occurs when an unpowered fan spins due to air flow within the supply or return duct. Windmilling can occur in a forward direction—the fan is rotating in the desired direction; or it may occur in a reverse direction—the fan is rotating in the nondesired direction.

Figure 4:
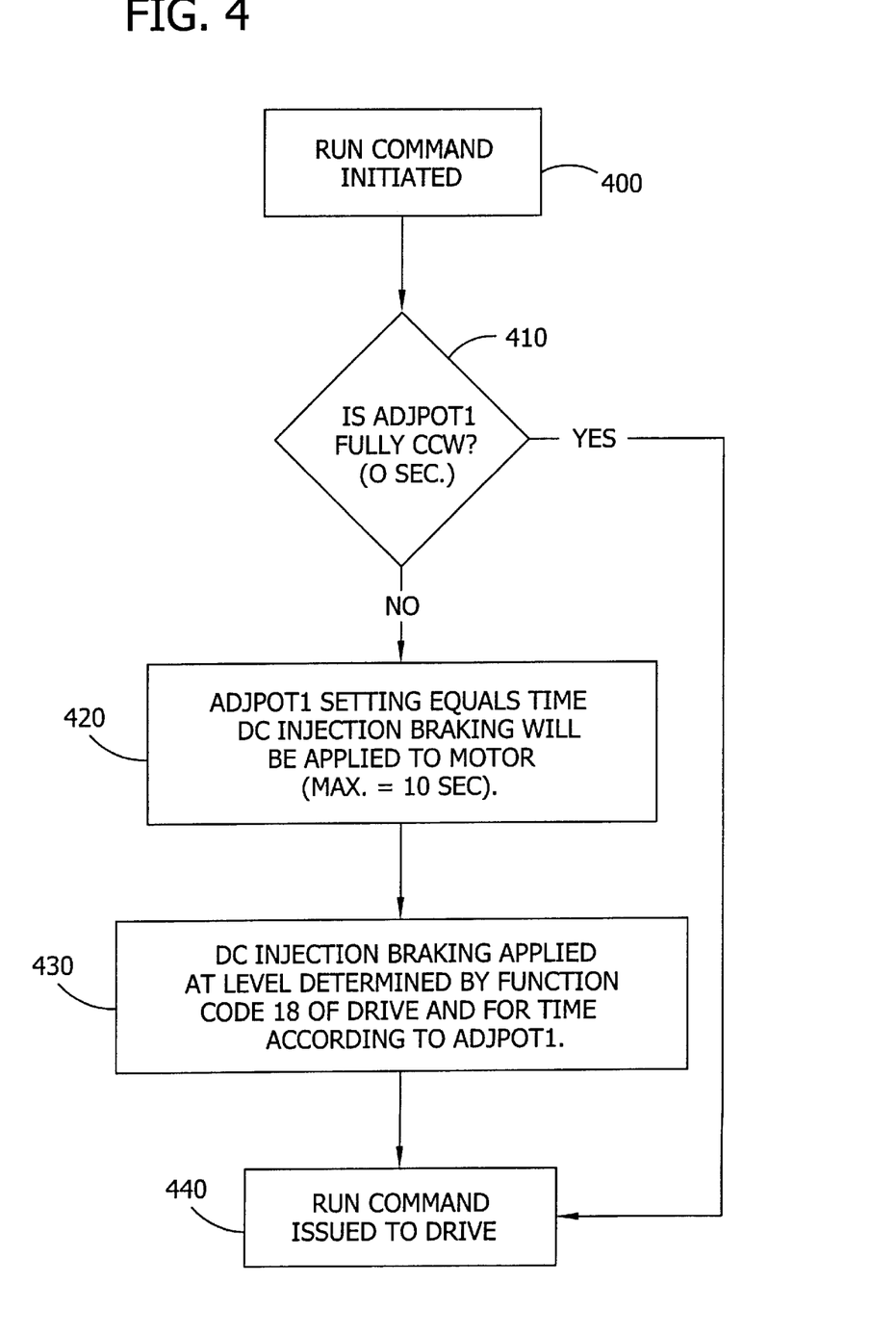
FIG. 4 is a flow chart describing a preferred embodiment for an anti-windmilling controller according to the present invention.

FIG. 4 provides a flow chart describing a preferred embodiment of the anti-windmilling system. As shown in block 400, when the unitary controller 300 (see FIG. 3) initiates a run command to a motor, the system begins the anti-windmilling process. A potentiometer provides an adjustable input (ADJPOT1) defining the DC injection braking period. Blocks 410 and 420 illustrate that ADJPOT1 may be set between zero seconds and ten seconds. It should be understood, however, that other timing options, such as a fixed braking period or periods in excess of ten seconds, are possible and these are simply illustrative of a preferred embodiment. The adjustable potentiometer ADJPOT1 is preferably located inside the unitary controller 300 as shown in FIG. 3, and is adjusted using a screwdriver, and not as part of normal operator controlled set points. Factory settings for adjustable potentiometer ADJPOT1 may reflect the size of the motor(s) employed in a given HVAC system. Thus, for example, the unitary controller 300 may be configured to provide relatively larger periods of DC injection braking for relatively larger motors.

As shown in FIG. 4 block 410, if ADJPOT1 is set to zero, no injection braking is applied. Otherwise, drive controller 330 (FIG. 3) provides up to ten seconds (100%) of DC injection braking prior to actually running the selected fan motor (see blocks 420 & 430). If ADJPOT1 indicates that no braking is selected, the system does not apply any braking and issues the run command (see block 440).

In one preferred embodiment, the amount of braking torque is adjustable by changing the strength of the DC injection braking. A keypad (not shown) provided on operator input 340 may be used to change a function code associated with the DC injection braking strength. The level is adjustable from zero to one hundred percent. The default, or "factory setting," depends on motor size. For motors of thirty horsepower or less, the unitary controller default may be set to, for example, twenty percent. For motors greater than thirty horsepower, the default setting may be increased to forty percent. Other settings are possible.

In the preferred embodiment as shown in FIGS. 3 and 4, the drive controller 330 outputs a DC injection braking signal comprised of a 0 Hz drive signal at a set braking strength for the amount of time commanded by ADJPOT1. Such an approach has benefits for fans windmilling in the reverse (undesired) direction; it prevents sudden power applications that could result in excess torque and stress on the fan and motor. For simplicity, however, the same braking scheme may be applied to motors running in the forward (desired) direction. The unitary controller of the present invention reflects this simplicity by using an open-loop motor control to minimize windmilling whereby there is no direct motor feedback (e.g., direction of rotation and rotational speed) to the unitary controller 300. In HVAC applications, motor speed regulation is typically of lesser importance than duct static pressure and air flow rates. Thus, an open-loop motor controller and anti-windmilling system is appropriate. Further, indirect motor feedback is available in the form of air flow and static pressure signals (see FIG. 3 lines 320, 322, and 324).

If direct motor or fan feedback is provided (e.g., a closed-loop control system using motor speed and/or direction of rotation), it is possible to employ a variable injection braking technique that further takes advantage of fans windmilling in the forward direction. For example, if the fan to be powered is windmilling in the forward direction, the drive controller 330 may be operated to "catch" the spinning motor by supplying an initial 60 Hz drive signal that then drops off to the motor speed, and then accelerates or decelerates to the desired set point. Those skilled in the art will recognize that there are means available to determine the direction and speed of fan and/or motor rotation, such as Hall sensors, optical sensors, back emf sensing, mechanical transducers, etc. Each of these means is capable of providing a signal representative of the direction of rotation of a supply or return fan.

DC injection braking uses a control circuit within the unitary controller to apply a DC voltage across the motor's stator windings at a set frequency point for a set duration of time. This type of braking results in a low amount of braking torque until the motor reaches a speed well below fifty percent. For example, the available braking torque increases sharply at speeds below 7 Hz.

In addition to DC injection braking, other forms of motor braking are possible. For example, alternative motor braking schemes include dynamic, regenerative and mechanical braking. First, dynamic braking is accomplished by continuing to excite the motor from the drive. This causes a regenerative current to the drive's DC intermediate bus circuit. Dynamic brake resistors are then placed across the DC bus to dissipate the power returned. The brake resistor is typically switched by a transistor or other power switch controlled by the drive. Second, regenerative braking is similar to dynamic braking. Regenerative braking, however, is accomplished electronically. The generated power is returned to the line through the power converter. It may also be simply dissipated as losses in the converter (subject to limitations). Third, motor mounted or separately mounted mechanical braking is also possible. Such devices use mechanical friction devices. Typically, when power to the motor is removed, the brake is set.

In view of the above, it will be seen that the several objects of the invention are achieved and other advantageous results attained.

As various changes could be made in the above constructions and methods without departing from the scope of the invention, it is intended that all matter contained in the above description and shown in the accompanying drawings shall be interpreted as illustrative only, and not in a limiting sense.

What is claimed is:

1. A fan control system suitable for use in air moving applications comprising:
    a pressure sensor responsive to an air pressure in a supply air duct for supplying a static pressure signal representative of the static air pressure in the supply air duct;
    a supply air flow sensor responsive to an air flow in a supply air duct for supplying a supply air flow signal representative of the air flow in the supply air duct;
    a return air flow sensor responsive to an air flow in a return air duct for supplying a return air flow signal representative of the air flow in the return air duct;
    a supply fan for moving air in the supply air duct, said supply fan being driven by a supply fan motor;
    a return fan for moving air in the return air duct, said return fan being driven by a return fan motor; and
    a unitary volumetric air flow controller connected to the supply fan and connected to the return fan, said air flow controller comprising:
        a drive controller selectively controlling the supply fan and the return fan;
        a process controller selectively providing a drive control signal to the drive controller in response to the static pressure signal, the supply air flow signal, and the return air flow signal, said drive controller and said process controller being mounted in a common housing; and
        wherein the drive controller is responsive to the drive control signal for selectively applying a supply drive power signal to the supply fan for energizing the supply fan, and for selectively applying a return drive signal to the return fan motor for energizing the return fan motor, whereby the static pressure in the supply air duct is maintained at a substantially constant pressure.

2. The fan control system of claim 1 wherein the supply drive signal is responsive to the static pressure signal whereby a constant pressure is maintained in the supply air duct.

3. The fan control system of claim 1 wherein the drive controller further comprises a modulator for modulating the return drive power signal as a function of the supply air flow signal and the return air flow signal.

4. The fan control system of claim 1 further comprising a set point control panel for providing an operator access to at least one operator control input.

5. The fan control system of claim 1 wherein the unitary volumetric air flow controller includes one or more controls for simultaneously providing static pressure control of air flow within the system, volumetric flow synchronization of air flow rates with the system, and drive control of the fans.

6. The fan control system of claim 1 wherein the unitary volumetric air flow controller includes operator adjustable controls including a hand-off-auto switch, an inverter/bypass selector and/or a test-isolate-normal switch.

7. A fan control system suitable for use in air moving applications comprising:

a pressure sensor responsive to an air pressure in an air duct for supplying a static pressure signal representative of the air pressure;

a supply air flow sensor responsive to an air flow in a supply air duct for supplying a supply air flow signal representative of the air flow in the supply air duct;

a return air flow sensor responsive to an air flow in a return air duct for supplying a return air flow signal representative of the air flow in the return air duct;

a supply fan for moving air in the supply air duct, said supply fan being driven by a supply fan motor;

a return fan for moving air in the return air duct, said return fan being driven by a return fan motor; and a volumetric air flow controller connected to the supply fan and connected to the return fan, said air flow controller for selectively applying a supply drive power signal to the supply fan motor for energizing the supply fan motor and for selectively applying a return drive signal to the return fan motor for energizing the return fan motor, said power drive signals being responsive to the static pressure signal, supply air flow signal, and return air flow signal, and said air flow controller further comprising an anti-windmilling controller for applying a braking signal to the supply fan motor.

8. The fan control system of claim 7 wherein the braking signal is applied to the supply fan motor when the supply drive power signal is not applied to the supply fan motor, said braking signal being applied for an anti-windmilling time period sufficient to ensure that a windmilling supply fan is brought to rest prior to applying the supply drive power signal.

9. The fan control system of claim 8 wherein the anti-windmilling time period is fixed.

10. The fan control system of claim 8 wherein the anti-windmilling controller further comprises rotation detection means responsive to a direction of rotation of the supply fan for providing a supply fan direction signal representative of the direction of rotation of the supply fan, such that when the supply fan direction signal indicates that the supply fan is rotating in a reverse direction, the braking signal comprises a dc injection signal.

11. A fan control system suitable for use in air moving applications comprising:

a pressure sensor responsive to an air pressure in an air duct for supplying a static pressure signal representative of the air pressure;

a supply air flow sensor responsive to an air flow in a supply air duct for supplying a supply air flow signal representative of the air flow in the supply air duct;

a return air flow sensor responsive to an air flow in a return air duct for supplying a return air flow signal representative of the air flow in the return air duct;

a supply fan for moving air in the supply air duct, said supply fan being driven by a supply fan motor;

a return fan for moving air in the return air duct, said return fan being driven by a return fan motor; and a volumetric air flow controller connected to the supply fan and connected to the return fan, said air flow controller for selectively applying a supply drive power signal to the supply fan motor for energizing the supply fan motor and for selectively applying a return drive signal to the return fan motor for energizing the return fan motor, said power drive signals being responsive to the static pressure signal, supply air flow signal, and return air flow signal, and said air flow controller further comprising an anti-windmilling controller for applying a braking signal to the return fan motor.

12. The fan control system of claim 8 wherein the braking signal is applied to the return fan motor when the return drive power signal is not applied to the return fan motor, said braking signal being applied for an anti-windmilling time period sufficient to ensure that a windmilling return fan is brought to rest prior to applying the return drive power signal.

13. The fan control system of claim 2 wherein the anti-windmilling time period is fixed.

14. The fan control system of claim 8 wherein the anti-windmilling controller further comprises rotation detection means responsive to a direction of rotation of the return fan for providing a return fan direction signal representative of the direction of rotation of the return fan, such that when the return fan direction signal indicates that the return fan is rotating in a reverse direction, the braking signal comprises a dc injection signal.

15. A fan control system suitable for use in air moving applications comprising:

a pressure sensor responsive to an air pressure in an air duct for supplying a static pressure signal representative of the air pressure;

a supply air flow sensor responsive to an air flow in a supply air duct for supplying a supply air flow signal representative of the air flow in the supply air duct;

a return air flow sensor responsive to an air flow in a return air duct for supplying a return air flow signal representative of the air flow in the return air duct;

a supply fan for moving air in the supply air duct, said supply fan being driven by a supply fan motor;

a return fan for moving air in the return air duct, said return fan being driven by a return fan motor; and a volumetric air flow controller connected to the supply fan and connected to the return fan, said air flow controller for selectively applying a supply drive power signal to the supply fan motor for energizing the supply fan motor and for selectively applying a return drive signal to the return fan motor for energizing the return fan motor, said power drive signals being responsive to the static pressure signal, supply air flow signal, and return air flow signal, and the volumetric air flow controller being responsive to an adjustable potentiometer for controlling injection braking of the fans to minimize windmilling.

16. A fan control system suitable for use in air moving applications comprising:

a pressure sensor responsive to an air pressure in an air duct for supplying a static pressure signal representative of the air pressure;

a supply air flow sensor responsive to an air flow in a supply air duct for supplying a supply air flow signal representative of the air flow in the supply air duct;

a return air flow sensor responsive to an air flow in a return air duct for supplying a return air flow signal representative of the air flow in the return air duct;

a supply fan for moving air in the supply air duct, said supply fan being driven by a supply fan motor;

a return fan for moving air in the return air duct, said return fan being driven by a return fan motor; and a volumetric air flow controller connected to the supply fan and connected to the return fan, said air flow controller for selectively applying a supply drive power signal to the supply fan motor for energizing the supply fan motor and for selectively applying a return drive signal to the return fan motor for energizing the return fan motor, said power drive signals being responsive to the static pressure signal, supply air flow signal, and return air flow signal, and said volumetric air flow controller including an open loop motor control for controlling injection braking of the fans to minimize windmilling.

* * * * *